United States Patent
Uchiyama

(10) Patent No.: US 10,979,873 B2
(45) Date of Patent: Apr. 13, 2021

(54) COMMUNICATION TERMINAL

(71) Applicant: FUJITSU COMPONENT LIMITED, Tokyo (JP)

(72) Inventor: Takuya Uchiyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/143,914

(22) Filed: Sep. 27, 2018

(65) Prior Publication Data

US 2019/0132716 A1    May 2, 2019

(30) Foreign Application Priority Data

Oct. 31, 2017 (JP) .............................. JP2017-210413

(51) Int. Cl.
    *H04W 4/38*     (2018.01)
    *H04W 52/02*     (2009.01)
    (Continued)

(52) U.S. Cl.
    CPC .............. *H04W 4/38* (2018.02); *G01C 19/00* (2013.01); *G01K 1/024* (2013.01); *G01P 15/165* (2013.01);
    (Continued)

(58) Field of Classification Search
    CPC .... H04W 4/38; H04W 52/0209; G01C 19/00; G01K 1/024; G01P 15/165; H04L 67/125
    See application file for complete search history.

(56) References Cited

U.S. PATENT DOCUMENTS

2006/0249323 A1* 11/2006 Kurata ................ B60C 23/0483
    180/233
2006/0271678 A1* 11/2006 Jessup ................... G06F 1/3203
    709/224

(Continued)

FOREIGN PATENT DOCUMENTS

JP     2006-298147     11/2006
JP     2013-114345     6/2013

OTHER PUBLICATIONS

Japanese Platform for Patent Information English abstract for Japanese Patent Publication No. 2006-298147, published Nov. 2, 2006.

(Continued)

*Primary Examiner* — Amine Benlagsir
(74) *Attorney, Agent, or Firm* — Staas & Halsey LLP

(57) ABSTRACT

A communication terminal includes: a power supply unit: a sensor: a wireless communication unit that transmits a detected value detected by the sensor to an external device in a wireless manner; and a control unit that sets one of a first mode and a second mode as an operation mode of the communication terminal, acquires the detected value detected by the sensor, and controls electric current to be supplied from the power supply unit, the electric current to be supplied to part of the control unit and the wireless communication unit in the second mode being made lower than in the first mode, wherein, when a difference between a present detected value detected by the sensor and a previous detected value detected by the sensor is smaller than a threshold value, the control unit sets the second mode as the operation mode of the communication terminal.

7 Claims, 6 Drawing Sheets

(51) Int. Cl.
*G01K 1/024* (2021.01)
*G01P 15/16* (2013.01)
*G01C 19/00* (2013.01)
*H04L 29/08* (2006.01)

(52) U.S. Cl.
CPC ....... *H04L 67/125* (2013.01); *H04W 52/0209* (2013.01)

(56) References Cited

U.S. PATENT DOCUMENTS

| | | | | |
|---|---|---|---|---|
| 2010/0164705 | A1* | 7/2010 | Blanchard | B60C 23/041 340/442 |
| 2011/0050638 | A1* | 3/2011 | Lee | G06F 1/3203 345/174 |
| 2015/0077035 | A1* | 3/2015 | Zhao | H02P 21/20 318/817 |
| 2016/0148099 | A1* | 5/2016 | Micali | G06N 5/04 706/11 |

OTHER PUBLICATIONS

Japanese Platform for Patent Information English abstract for Japanese Patent Publication No. 2013-114345, published Jun. 10, 2013.

\* cited by examiner

COMMUNICATION TERMINAL

CROSS-REFERENCE TO RELATED APPLICATION

This application is based upon and claims the benefit of priority of the prior Japanese Patent Application No. 2017-210413 filed on Oct. 31, 2017, the entire contents of which are incorporated herein by reference.

FIELD

A certain aspect of the embodiments is related to a communication terminal.

BACKGROUND

Attention is being drawn these days to the use of beacon terminals that utilize the Bluetooth (registered trademark) Low Energy wireless technology in sensing impacts at times of machine management or shipment at factories, and in acquiring environmental data outdoors. For example, a beacon terminal is installed in a factory, and acquires temperature or acceleration data. The data is transmitted to a central unit such as a smartphone or a tablet terminal. The central unit analyzes the data, and notifies the user of the result of the analysis.

There is also a known wheel condition acquiring device that includes: a first sensor unit that includes a first sensor that senses the condition of a wheel, and is in an operation mode that is a normal mode or a sleep mode; and a second sensor unit that includes a second sensor that senses the condition of a different wheel from the wheel to be sensed by the first sensor, and switches operation modes of the first sensor unit in accordance with the wheel condition sensed by the second sensor (see Japanese Patent Application Laid-Open No. 2006-298147, for example).

Further, there is a known wireless tag that minimizes the intervals of tag information transmission in a case where the acceleration detected by an acceleration sensor is equal to or higher than a threshold value, and widens the intervals of tag information transmission in a stepwise manner in a case where the acceleration detected by the acceleration sensor is lower than the threshold value (see Japanese Patent Application Laid-Open No. 2013-114345, for example).

SUMMARY

According to an aspect of the present invention, there is provided a communication terminal that communicates with an external device, the communication terminal including: a power supply unit; a sensor; a wireless communication unit that transmits a detected value detected by the sensor to the external device in a wireless manner; and a control unit that sets one of a first mode and a second mode as an operation mode of the communication terminal, acquires the detected value detected by the sensor, and controls electric current to be supplied from the power supply unit, a frequency of detection by the sensor and a frequency of operation of the wireless communication unit in the second mode or the electric current to be supplied to part of the control unit and the wireless communication unit in the second mode being made lower than in the first mode, wherein, when a difference between a present detected value detected by the sensor and a previous detected value detected by the sensor is not smaller than a threshold value, the control unit sets the first mode as the operation mode of the communication terminal, and, when the difference between the present detected value detected by the sensor and the previous detected value detected by the sensor is smaller than the threshold value, the control unit sets the second mode as the operation mode of the communication terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In beacon terminals, a battery is often used as the power supply means, having a high degree of freedom in regard to installation sites. A beacon terminal is expected to be used for a long period of time, in view of its purpose of use. Therefore, the battery in a beacon terminal is required to have a long service life. Further, a beacon terminal transmits data acquired by sensors to a central unit. Therefore, most of battery power consumption is caused by the electric current consumed at times of data transmission.

The following is a description of an embodiment of the present invention, with reference to the drawings.

Figure 1:
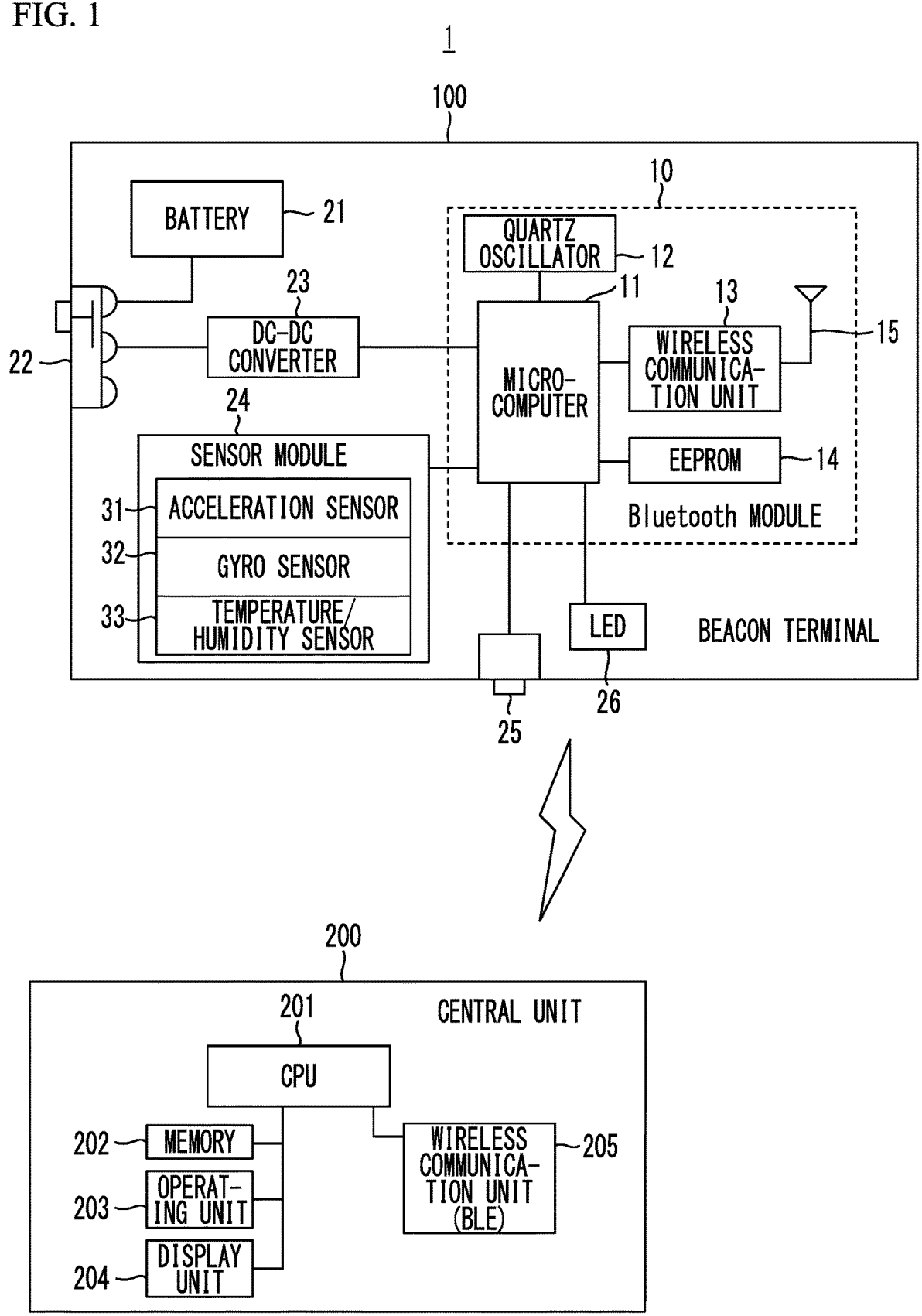
FIG. 1 is a configuration diagram of a communication system including a beacon terminal according to this embodiment.

FIG. 1 is a configuration diagram of a communication system including a beacon terminal according to this embodiment.

The communication system 1 in FIG. 1 includes a beacon terminal 100 as a communication terminal, and a central unit 200 as an information processing device. The central unit 200 is an information communication terminal such as a smartphone, a tablet, or a notebook personal computer, for example, and can be carried around by a user. The beacon terminal 100 is installed in a facility. Note that the communication system 1 may include more than one beacon terminal 100.

As a broadcaster, the beacon terminal 100 transmits data including the various kinds of sensors described later, and the central unit 200 can recognize the existence of the beacon terminal 100 by scanning the data.

The beacon terminal 100 includes: a microcomputer 11 as a control unit that controls the entire operation of the beacon terminal 100; a quartz oscillator 12 that outputs a clock signal to the microcomputer 11; a wireless communication unit 13 that transmits data in compliance with the Bluetooth Low Energy (BLE) standard; an EEPROM (Electrically Erasable Programmable Read-Only Memory) 14 as a storage unit that stores various kinds of data and setting data; and an antenna 15. The microcomputer 11, the quartz oscillator 12, the wireless communication unit 13, the EEPROM 14, and the antenna 15 are mounted on a circuit board that is a Bluetooth module 10.

The beacon terminal 100 further includes: a battery 21 as a power supply unit that supplies drive current to the Bluetooth module 10; a slide switch 22 that switches on and off the beacon terminal 100; a DC-DC converter 23 that transforms the voltage supplied from the battery 21; a sensor module 24 including sensors; a push button 25 that is pushed when operation modes of the beacon terminal 100 are switched, and when the setting values are rewritten; and an LED 26 that notifies the user of the current operation mode of the beacon terminal 100. In accordance with the operation mode (normal mode or low-power consumption mode), the LED 26 changes light-emitting states (a light-off state, a light-on state, a blinking state, a colored light state, or the like).

The sensor module 24 includes: an acceleration sensor 31 that detects the acceleration of the beacon terminal 100; a gyro sensor 32 that detects the inclination and the orientation of the beacon terminal 100; and a temperature/humidity sensor 33 that detects the temperature and the humidity in the surroundings of the beacon terminal 100. Note that the sensor module 24 should include at least one sensor among the acceleration sensor 31, the gyro sensor 32, and the temperature/humidity sensor 33, and may include a sensor other than the acceleration sensor 31, the gyro sensor 32, and the temperature/humidity sensor 33.

The quartz oscillator 12, the wireless communication unit 13, and the EEPROM 14 are connected to the microcomputer 11, and the antenna 15 is connected to the wireless communication unit 13. The DC-DC converter 23, the sensor module 24, the push button 25, and the LED 26 are connected to the microcomputer 11. The battery 21 and the DC-DC converter 23 are connected to the switch 22.

The central unit 200 acquires the values of the respective sensors of the sensor module 24.

The central unit 200 includes a CPU 201, a memory 202, an operating unit 203, a display unit 204, and a wireless communication unit 205. The CPU 201 is connected to the memory 202, the operating unit 203, the display unit 204, and the wireless communication unit 205.

The CPU 201 controls the entire operation of the central unit 200. The memory 202 stores various sensor values received from the beacon terminal 100 and the setting information for rewriting in the beacon terminal 100. The operating unit 203 is a touch panel, a keyboard, or the like, and is used for inputting data. The display unit 204 is a display or the like, and displays various kinds of data. The wireless communication unit 205 performs wireless communication with the wireless communication unit 13, in compliance with the Bluetooth Low Energy (BLE) standard.

The beacon terminal 100 has normal mode and low-power consumption mode as operation modes. In the normal mode, electric current is constantly supplied to the microcomputer 11 and the wireless communication unit 13. In the low-power consumption mode, on the other hand, power consumption is reduced to a smaller amount than in the normal mode, and the microcomputer 11 performs control so that the frequency at which (the number of times) electric current is supplied to part (the portions relating to the wireless communication unit 13, the EEPROM 14, the LED 26, and the like) of the microcomputer 11 and the wireless communication unit 13 is reduced, or the supply of electric current to the part of the microcomputer 11 and the wireless communication unit 13 is stopped.

The beacon terminal 100 in the normal mode continues to transmit the values of the detected acceleration, the detected inclination and orientation, and the detected temperature and humidity. In a case where the beacon terminal 100 stays still, these detected values hardly change, and therefore, the microcomputer 11 determines that the beacon terminal 100 is staying still, from these detected values.

In this embodiment, data transmission after the beacon terminal 100 comes to a halt is skipped, and thus, power consumption is reduced.

In a case i) where successive detected values are the same or similar, the microcomputer 11 of the beacon terminal 100 determines that the beacon terminal 100 is staying still, and switches from the normal mode to the low-power consumption mode. Alternatively, in a case ii) where the beacon terminal 100 is made to perform a specific operation, the microcomputer 11 determines whether the pattern of detected values successively obtained matches the detected value pattern set beforehand in the EEPROM 14, and, if the detected value pattern matches the detected value pattern set beforehand in the EEPROM 14, the microcomputer 11 switches from the normal mode to the low-power consumption mode.

For example, the acceleration sensor 31 detects gravitational acceleration as well as the acceleration of the beacon terminal 100. Therefore, even when the beacon terminal 100 stays still, the value detected by the acceleration sensor 31 is not necessarily 0. Because of this, by the above method i), in a case where the same or similar values are successively detected, the microcomputer 11 determines that the beacon terminal 100 is staying still.

The above method ii) is a means for switching the operation mode from the normal mode to the low-power consumption mode as appropriate. When the beacon terminal 100 is swung to a particular direction, the microcomputer 11 detects the pattern of the acceleration.

A conventional central unit determines that a beacon terminal is staying still in a case where similar detected values have continuously been transmitted from the beacon terminal. Therefore, in a case where any detected value from the beacon terminal cannot be detected, it might not be possible to determine that the beacon terminal 100 is staying still. In this embodiment, on the other hand, when the microcomputer 11 determines that the beacon terminal 100 is staying still, the microcomputer 11 switches the operation mode from the normal mode to the low-power consumption mode, and notifies the central unit 200 of the switching to the low-power consumption mode. Upon receipt of the notification of the low-power consumption mode, the central unit 200 determines that the beacon terminal 100 is staying still even if detected values from the respective sensors cannot be received, and, at the same time, the central unit 200 remains connected to the beacon terminal 100.

Figure 2:
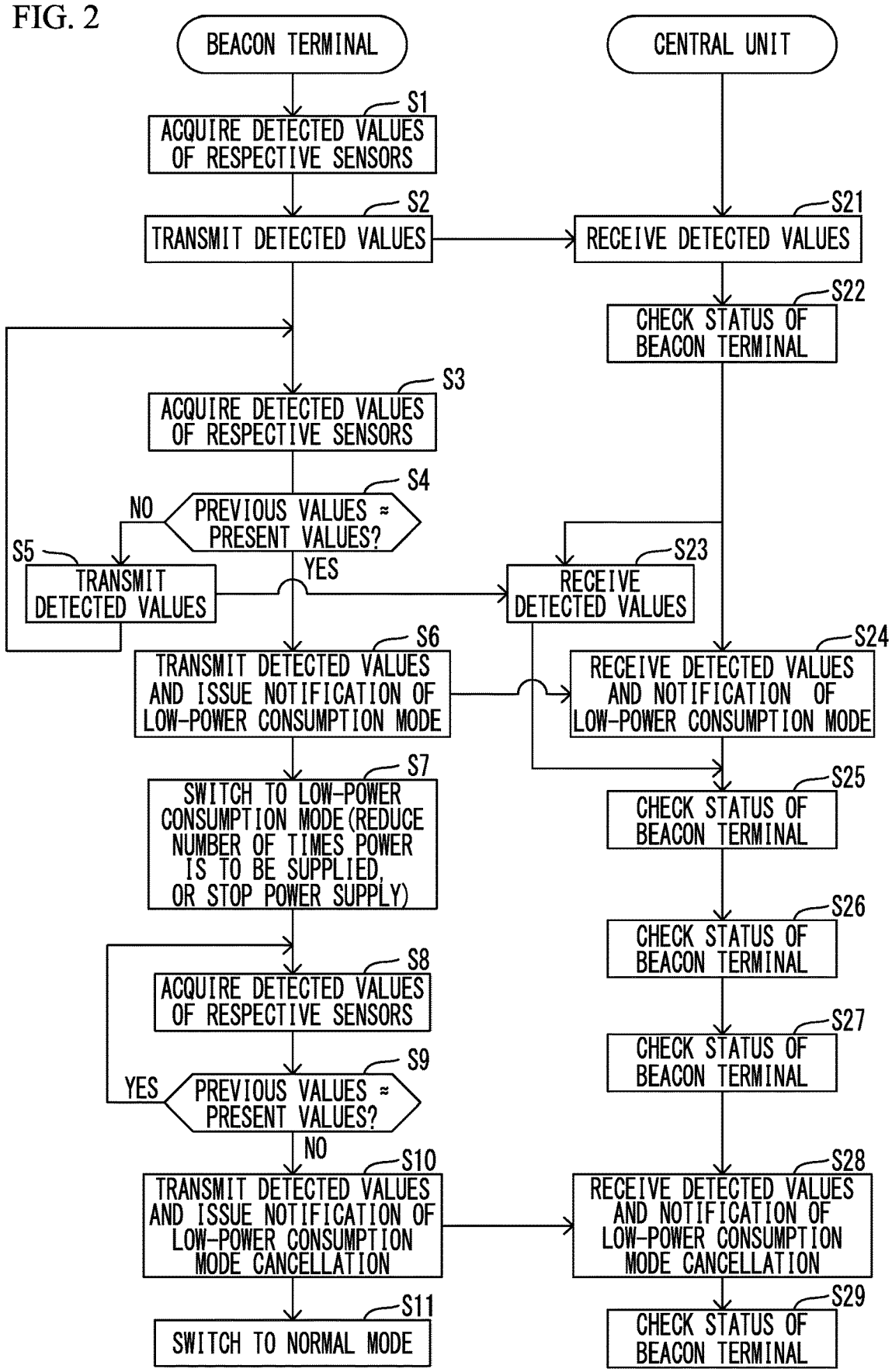
FIG. 2 is a flowchart showing operations of the beacon terminal and a central unit.

FIG. 2 is a flowchart showing operations of the beacon terminal 100 and the central unit 200. Note that, in the initial state, the operation mode of the beacon terminal 100 is the normal mode.

First, the microcomputer 11 acquires the detected values of the respective sensors (S1), and transmits the acquired detected values to the central unit 200 via the wireless communication unit 13 (S2). The CPU 201 receives the detected values of the respective sensors via the wireless communication unit 205 (S21), and checks the status of the beacon terminal 100 (S22). In a case where only the detected values of the respective sensors are received, the CPU 201 determines the operation mode of the beacon terminal 100 to be the normal mode.

The microcomputer 11 continues to acquire the detected values of the respective sensors (S3), and determines whether the acquired values (present values) acquired in S3 are the same as or similar to the detected values (previous values) acquired in S1 (S4). Here, the present values being similar to the previous values means that differences between the present values and the previous values are smaller than a predetermined threshold value. In the description below, detected values being the same or similar will be collectively referred to as "the detecting values being the same".

If the detected values acquired in S3 are not the same as the detected values acquired in S1 (NO in S4), the microcomputer 11 transmits the detected values acquired in S3 to the central unit 200 via the wireless communication unit 13 (S5). After that, the process returns to S3. The CPU 201 receives the detected values transmitted in S5 (S23).

If the detected values acquired in S3 are the same as the detected values acquired in S1 (YES in S4), the microcomputer 11 transmits the detected values acquired in S3 to the central unit 200 via the wireless communication unit 13, and notifies the central unit 200 of the switching to the low-power consumption mode (S6), so that the operation mode switches from the normal mode to the low-power consumption mode (S7). The microcomputer 11 also lowers the frequency of the electric current supply to the wireless communication unit 13 and part of the microcomputer 11, or stops the electric current supply to the wireless communication unit 13 and part of the microcomputer 11 (S7). As result, the frequency of transmission of the detected values of the respective sensors is lowered, or transmission of the detected values of the respective sensors is stopped. Thus, power consumption is reduced. However, the microcomputer 11 regularly acquires the detected values of the respective sensors by timer interrupts even in the low-power consumption.

The CPU 201 receives the detected values and the notification of the switching to the low-power consumption mode transmitted to the central unit 200 (S24), and checks the status of the beacon terminal 100 (S25). In a case where a notification of switching to the low-power consumption mode is received, the CPU 201 determines the operation mode of the beacon terminal 100 to be the low-power consumption mode. The CPU 201 also recognizes that the beacon terminal 100 has come to a halt, and stopped the data transmission. The CPU 201 then determines that the beacon terminal 100 is located within a coverage area even though the CPU 201 does not regularly receive data, and remains connected to the beacon terminal 100. Even if the detected values of the respective sensors cannot be regularly received, the CPU 201 regularly checks the status of the beacon terminal 100 (S26, S27).

The microcomputer 11 acquires the detected values of the respective sensors (S8), and determines whether the present values acquired in S8 are the same as the previous values acquired in S3 (S9). If the detected values acquired in S8 are the same as the detected values acquired in S3 (YES in S9), the microcomputer 11 maintains the low-power consumption mode, and returns to S8. If the detected values acquired in S8 are not the same as the detected values acquired in S3 (NO in S9), the microcomputer 11 transmits the detected values acquired in S8 and a notification of cancellation of the low-power consumption mode to the central unit 200 (S10), so that the operation mode switches from the low-power consumption mode to the normal mode (S11). As a result, the frequency of transmission of the detected values of the respective sensors returns to the original value, or transmission of the detected values of the respective sensors is resumed.

The CPU 201 receives the detected values and the notification of cancellation of the low-power consumption mode transmitted in S10 (S28), and checks the status of the beacon terminal 100 (S29). In a case where a notification of cancellation of the low-power consumption mode is received, the CPU 201 determines the operation mode of the beacon terminal 100 to be the normal mode.

Figure 3:
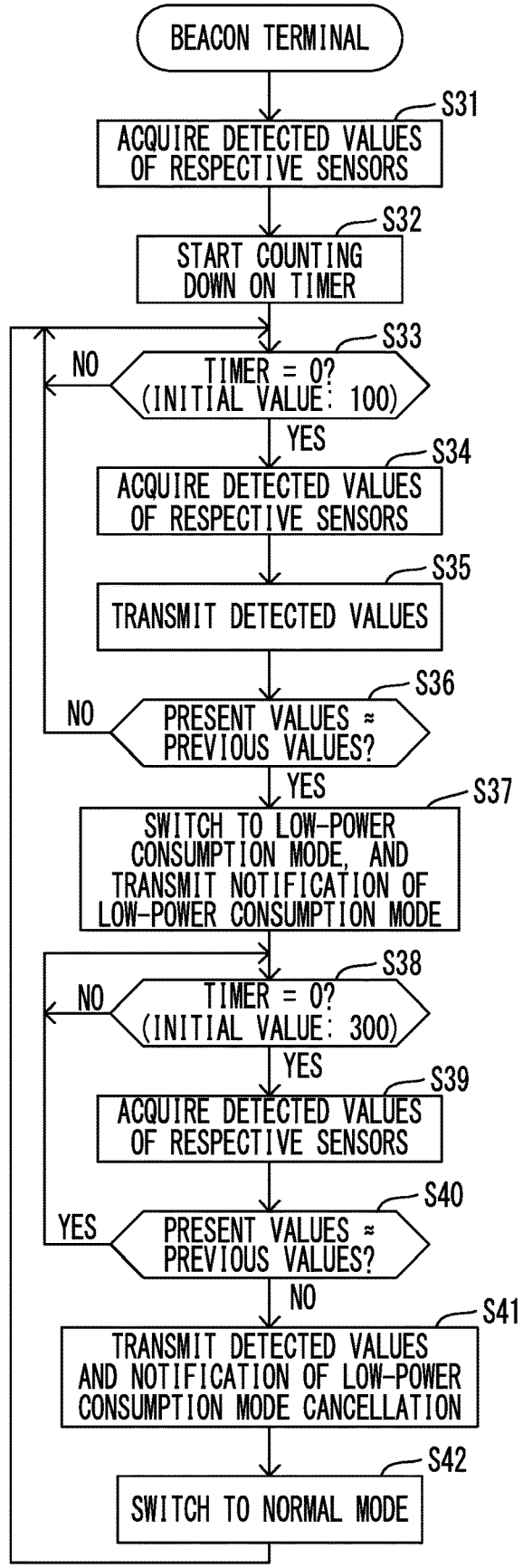
FIG. 3 is a flowchart showing a process to be performed by a microcomputer in a case where the frequency of the electric current supply to part of the microcomputer and a wireless communication unit is lowered.

FIG. 3 is a flowchart showing a process to be performed by the microcomputer 11 in a case where the frequency at which electric current is supplied to part of the microcomputer 11 and the wireless communication unit 13 is reduced in the low-power consumption mode. Note that, in the initial state, the operation mode of the beacon terminal 100 is the normal mode.

The microcomputer 11 acquires the detected values of the respective sensors (S31). Here, the initial values of the respective sensors are acquired. The microcomputer 11 then starts counting down on a timer in accordance with a clock signal from the quartz oscillator 12 (S32). The microcomputer 11 stores a software timer to be used for periodically acquiring the values of the respective sensors. The initial value of the timer in the normal mode is 100 ms, and counts down by 1 ms per clock cycle.

The microcomputer 11 determines whether the timer value is 0 (S33). If the timer value is not 0 (NO in S33), the microcomputer 11 repeats the determination in S33. If the timer value is 0 (YES in S33), the microcomputer 11 acquires the detected values from the respective sensors (S34), and transmits the detected values of the respective sensors to the central unit 200 (S35).

The microcomputer 11 then determines whether the detected values acquired in S34 are the same as the detected values acquired in S31 (S36).

If the detected values acquired in S34 are not the same as the detected values acquired in S31 (NO in S36), the process returns to S33. If the detected values acquired in S34 are the same as the detected values acquired in S31 (YES in S36), the microcomputer 11 switches the operation mode to the low-power consumption mode, and transmits a notification of switching to the low-power consumption mode to the central unit 200 (S37).

The microcomputer 11 determines whether the timer value is 0 (S38). Note that the initial value of the timer in the low-power consumption mode is 300 ms, for example, and is greater than the initial value of the timer in the normal mode. The timer counts down by 1 ms per clock cycle.

If the timer value is not 0 (NO in S38), the determination in S38 is repeated. If the timer value is 0 (YES in S38), on the other hand, the microcomputer 11 acquires the detected values of the respective sensors (S39).

The microcomputer 11 then determines whether the detected values acquired in S39 are the same as the detected values acquired in S34 (S40). If the detected values acquired in S39 are the same as the detected values acquired in S34 (YES in S40), the microcomputer 11 maintains the low-power consumption mode. The microcomputer 11 then sets the timer back to the initial value (300 ms, for example) in the low-power consumption mode, and returns to S38. If the detected values acquired in S39 are not the same as the detected values acquired in S34 (NO in S40), the microcomputer 11 transmits the detected values acquired in S39 and a notification of cancellation of the low-power consumption mode to the central unit 200 (S41), and switches the operation mode to the normal mode (S42). The microcomputer 11 then sets the timer back to the initial value of the normal mode, and returns to S33.

As described above, in FIG. 3, the frequency of transmission of the detected values of the respective sensors in the low-power consumption mode is lowered, and the microcomputer 11 regularly acquires the detected values from the respective sensors, to determine whether there is a change in the detected values. If the beacon terminal 100 moves, a change appears in the detected values from the respective sensors. Therefore, in a case where the detected values from the respective sensors have a change equal to or greater than a predetermined threshold value, the microcomputer 11 returns to the normal mode, and increases the frequency of transmission of the detected values of the respective sensors to a transmission frequency suitable for the normal mode.

Figure 4:
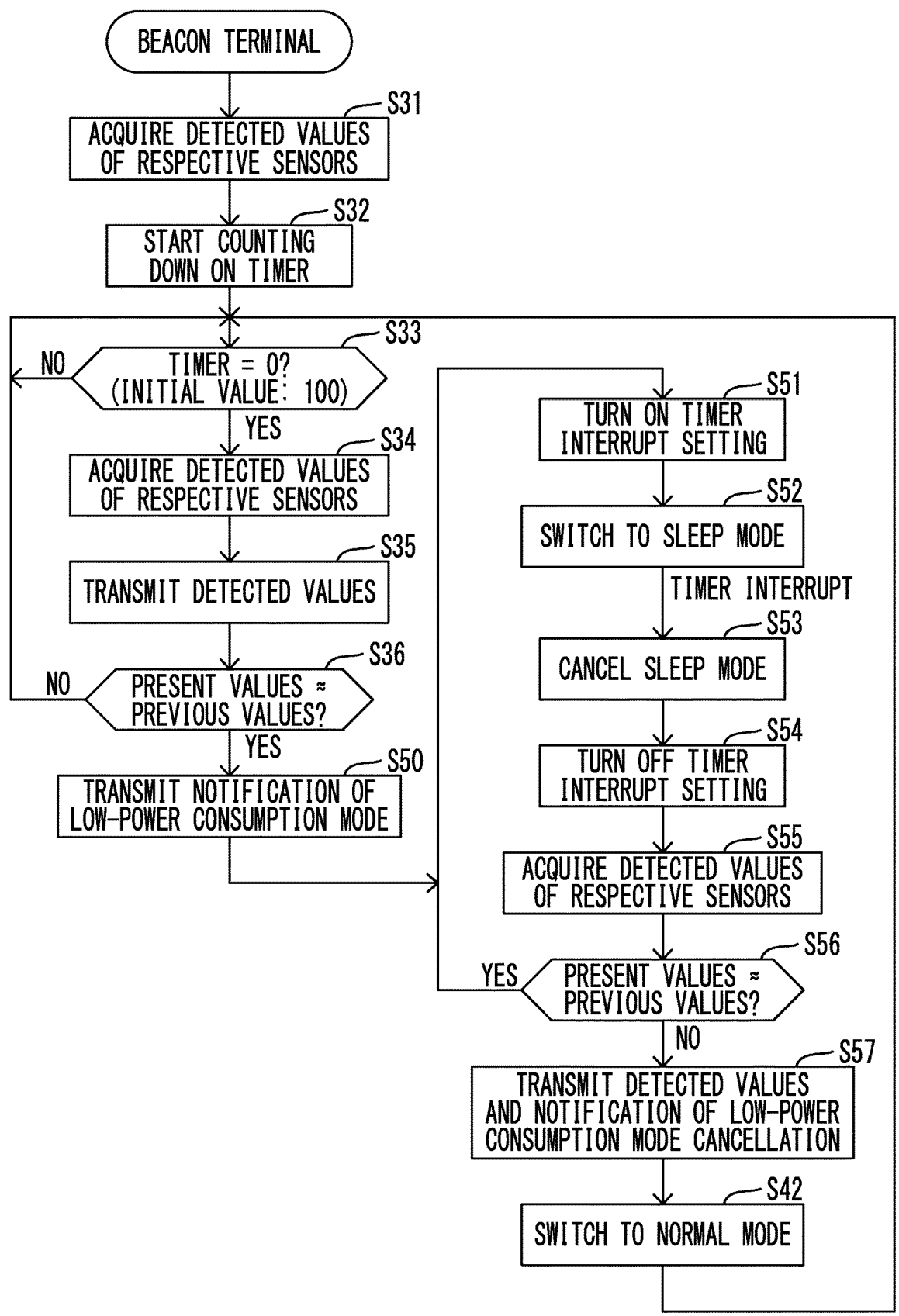
FIG. 4 is a flowchart showing a process to be performed by the microcomputer in a case where the operation mode switches to a sleep mode.

FIG. 4 is a flowchart showing a process to be performed by the microcomputer 11 in a case where the operation mode switches to a sleep mode that is one kind of the low-power consumption mode. Note that the same procedures as those shown in FIG. 3 are denoted by the same step numbers as those used in FIG. 3, and explanation of them is not repeated herein.

First, the procedures in S31 through S36 are carried out. In S36, if the detected values acquired in S34 are the same as the detected values acquired in S31 (YES in S36), the microcomputer 11 transmits a notification of switching to the low-power consumption mode to the central unit 200 (S50), turns on the timer interrupt setting (S51), and switches the operation mode to the sleep mode (S52). In the sleep mode, the electric current supply to part of the microcomputer 11 and the wireless communication unit 13 is completely stopped.

When a timer interrupt is received, the microcomputer 11 cancels the sleep mode (S53), trims off the timer interrupt setting (S54), and acquires the detected values of the respective sensors (S55). The microcomputer 11 determines whether the detected values acquired in S55 are the same as the detected values acquired in S34 (S56). If the detected values acquired in S55 are the same as the detected values acquired in S34 (YES in S56), the microcomputer 11 returns to S51, and switches back to the sleep mode. If the detected values acquired in S55 are not the same as the detected values acquired in S34 (NO in S56), the microcomputer 11 transmits the detected values acquired in S55 and a notification of cancellation of the low-power consumption mode to the central unit 200 (S57), switches the operation mode to the normal mode (S42), and returns to S33.

As described above, in a case where the wireless communication unit 13 and part of the microcomputer 11 are put into the sleep mode, the wireless communication unit 13 and the microcomputer 11 are regularly woken up by a timer interrupt, so that the microcomputer 11 acquires the detected values of the respective sensors, and determines movement of the beacon terminal 100. If the microcomputer 11 determines that the beacon terminal 100 has moved (NO in S56), the microcomputer 11 switches the operation mode from the low-power consumption mode to the normal mode, and resumes transmission of the detected values of the respective sensors.

The acceleration sensor 31, the gyro sensor 32, and the temperature/humidity sensor 33 each have a signal line for sending detected values to the microcomputer 11, but may further have another signal line for detecting a change between successive detected values and notifying the microcomputer 11 of the change between the successive detected values. In this case, the microcomputer 11 receives a signal indicating a change between detected values as an external interrupt from the respective sensors.

Figure 5:
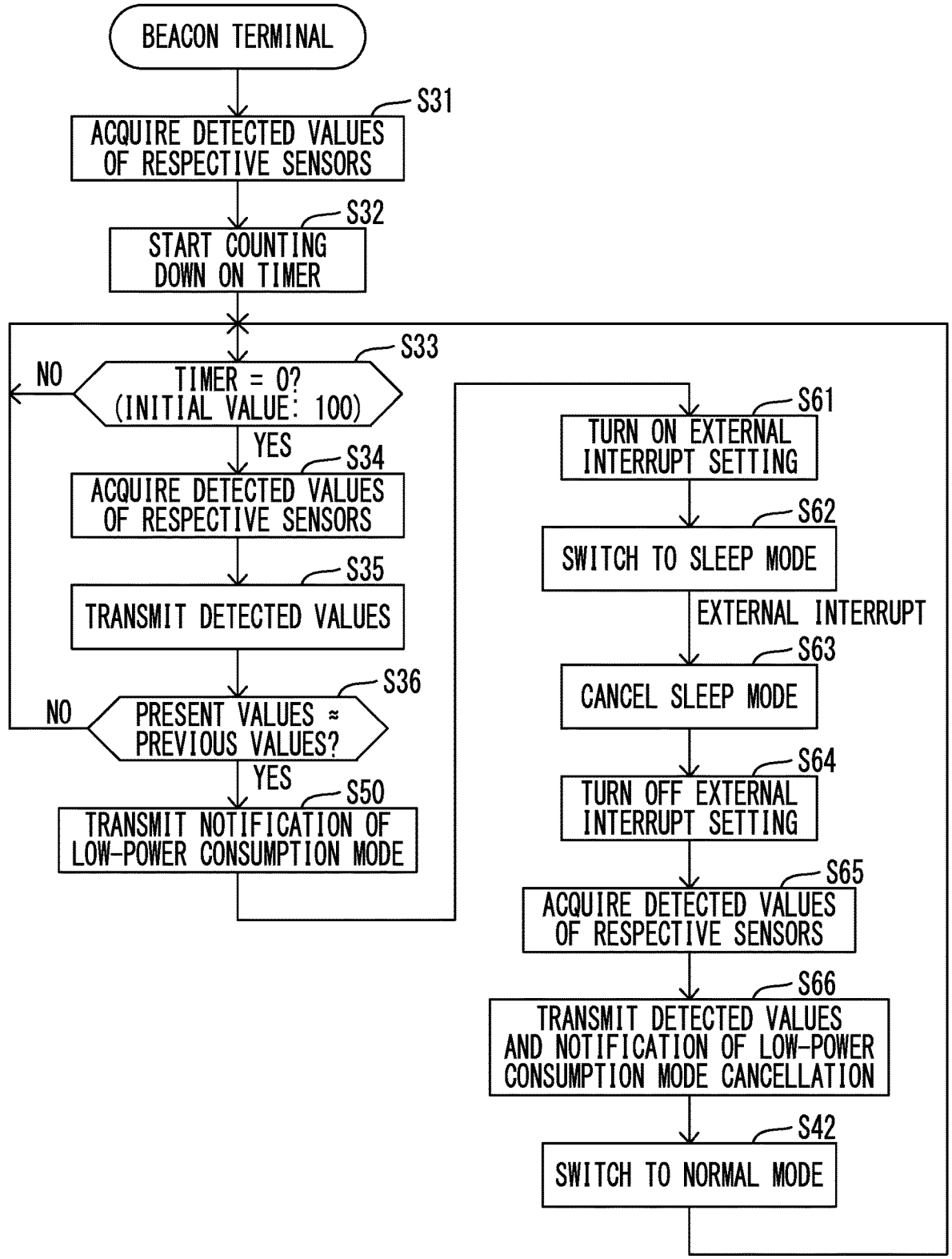
FIG. 5 is a flowchart showing a medication of the process to be performed by the microcomputer in a case where the operation mode switches to the sleep mode.

FIG. 5 is a flowchart showing a modification of the process to be performed by the microcomputer 11 in a case where the operation mode switches to the sleep mode. Note that the same procedures as those shown in FIGS. 3 and 4 are denoted by the same step numbers as those used in FIGS. 3 and 4, and explanation of them is not repeated herein. The acceleration sensor 31, the gyro sensor 32, and the temperature/humidity sensor 33 each have a signal line for sending detected values to the microcomputer 11, and further have another signal line for notifying the microcomputer 11 of a change between successive detected values.

In FIG. 5, the procedures in S31 through S36 and S50 are first carried out. After S50, the microcomputer 11 turns on the external interrupt setting (S61), and switches the operation mode to the sleep mode (S62). Upon receipt of a signal indicating a change between detected values as an external interrupt from the respective sensors, the microcomputer 11 cancels the sleep mode (S63), turns off the external interrupt setting (S64), and acquires the detected values of the respective sensors (S65). The microcomputer 11 then transmits the detected values acquired in S65 and a notification of cancellation of the low-power consumption mode to the central unit 200 (S66), switches the operation mode to the normal mode (S42), and returns to S33.

As described above, upon receipt of a signal indicating a change between detected values as an external interrupt, the microcomputer 11 wakes up the wireless communication unit 13 and part of the microcomputer 11, switches the operation mode from the low-power consumption mode to the normal mode, and resumes transmission of the detected values of the respective sensors. Since the respective sensors have already detected the change between successive detected values, the microcomputer 11 does not need to detect a change between detected values. Furthermore, there is no need to regularly wake up the wireless communication unit 13 and part of the microcomputer 11, and thus, power consumption can be further reduced.

Figure 6:
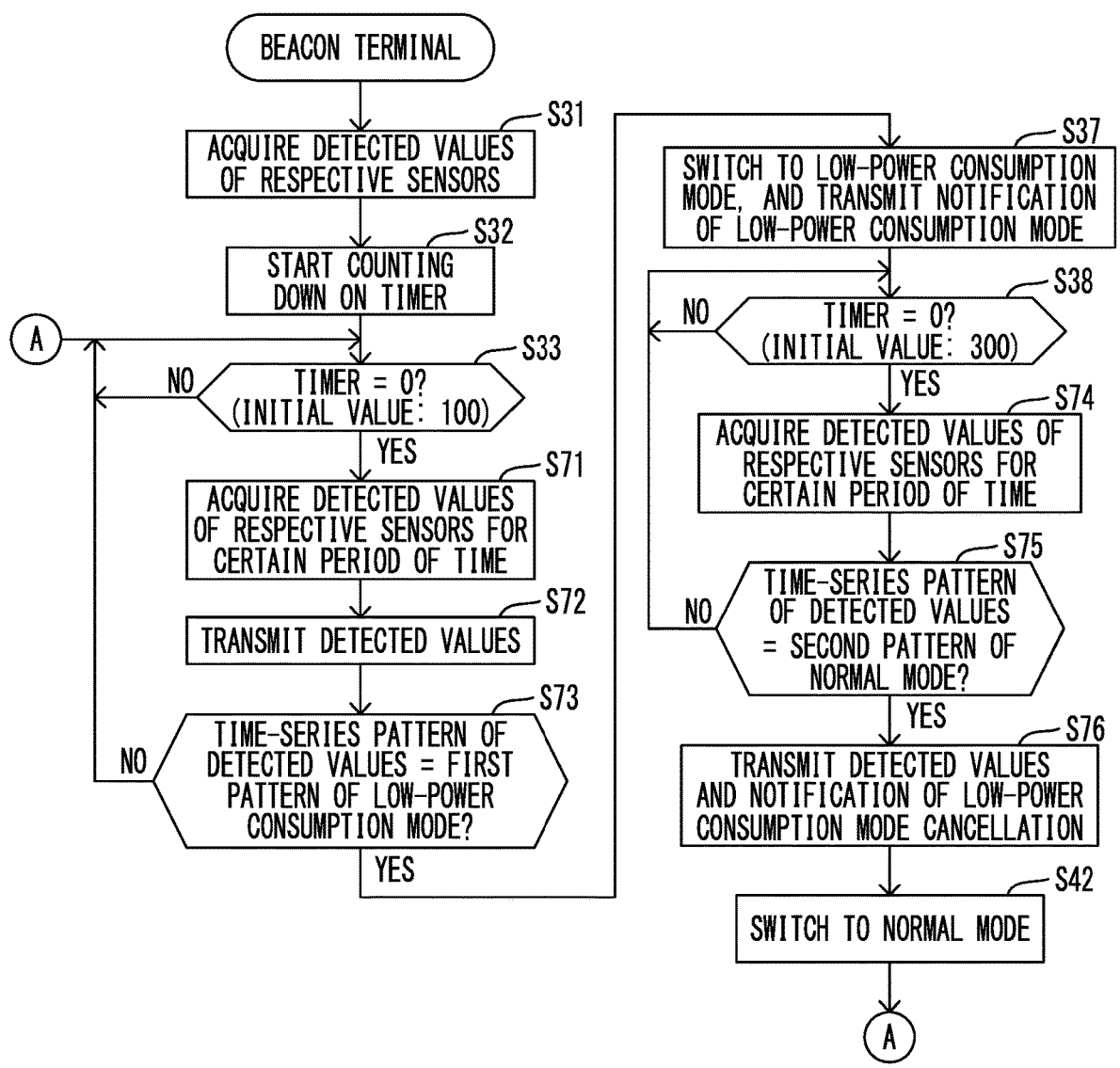
FIG. 6 is a flowchart showing a process to be performed by the microcomputer in a case where the operation mode switches to a low-power consumption mode.

FIG. 6 is a flowchart showing a process to be performed by the microcomputer 11 in a case where the operation mode, switches to the low-power consumption mode. Note that the same procedures as those shown in FIG. 3 are denoted by the same step numbers as those used in FIG. 3, and explanation of them is not repeated herein.

First, the procedures in S31 through S33 are carried out. After S33, the microcomputer 11 acquires the detected values of the respective sensors for a certain period of time (S71), and transmits the detected values of the respective sensors to the central unit 200 (S72).

The microcomputer 11 determines whether the time-series pattern of the detected values acquired in S71 is a first pattern indicating an instruction for switching to the low-power consumption mode (S73). For example, the first pattern is the time-series pattern of detected values from the acceleration sensor 31 in a case where the beacon terminal 100 is swung up and down five times, or the time-series pattern of detected values from the gyro sensor 32 in a case where the beacon terminal 100 is rotated clockwise five times. The first pattern is stored beforehand into the EEPROM 14.

If the time-series pattern of the detected values acquired in S71 is not the first pattern (NO in S73), the microcomputer 11 returns to S33. If the time-series pattern of the detected values acquired in S71 is the first pattern (YES in S73), the microcomputer 11 switches the operation mode to the low-power consumption mode, and transmits a notification of the switching to the low-power consumption mode to the central unit 200 (S37).

After that, the microcomputer 11 determines whether the timer value is 0 (S38). If the timer value is not 0 (NO in S38), the microcomputer 11 repeats the determination in S38. If the timer value is 0 (YES in S38), the microcomputer 11 acquires the detected values of the respective sensors for a certain period of time (S74).

The microcomputer 11 determines whether the time-series pattern of the detected values acquired in S74 is a second pattern indicating an instruction for switching to the normal mode (S75). For example, the second pattern is the time-series pattern of detected values from the acceleration sensor 31 in a case where the beacon terminal 100 is swung to right and left five times, or the time-series pattern of detected values from the gyro sensor 32 in a case where the beacon terminal 100 is rotated counterclockwise five times. The second pattern is stored beforehand into the EEPROM 14.

If the time-series pattern of the detected values acquired in S74 is not the second pattern (NO in S75), the microcomputer 11 returns to S38. If the time-series pattern of the detected values acquired in S74 is the second pattern (YES in S75), the microcomputer 11 transmits the detected values acquired in S74 and a notification of cancellation of the low-power consumption mode to the central unit 200 (S76), switches the operation mode to the normal mode (S42), sets the timer back to the initial value of the normal mode, and returns to S33.

As described above, the beacon terminal 100 is swung in a predetermined direction or is rotated in a predetermined direction, so that the operation mode can be switched to the low-power consumption mode or the normal mode. Thus, operation modes of the beacon terminal 100 can be easily switched in accordance with the intention of the user.

In a case where the operation mode of the beacon terminal 100 is switched to the low-power consumption mode (the sleep mode), as in S7 in FIG. 2, S37 in FIGS. 3 and 6, S52 in FIG. 4, and S62 in FIG. 5, the microcomputer 11 changes the LED 26 to the light-emitting state of the low-power consumption mode. In a case where the operation mode of the beacon terminal 100 is switched to the normal mode, as in S11 in FIG. 2 and S42 in FIGS. 3 through 6, the microcomputer 11 changes the LED 26 to the light-emitting state of the normal mode.

As described so far, according to this embodiment, the beacon terminal 100 includes: the wireless communication unit 13 that transmits detected values detected by the sensors 31, 32, and 33 to the central unit 200 in a wireless manner; and the microcomputer 11 that has the normal mode and the low-power consumption mode as the operation modes of the beacon terminal 100, acquires the detected values detected by the respective sensors, and controls the electric current to be supplied from the battery 21, the power consumption in the low-power consumption mode being reduced to a smaller amount than that in the normal mode. In a case where the differences between the present detected values detected by the respective sensors and the previous detected values are smaller than the threshold value, the microcomputer 11 sets the low-power consumption mode as the operation mode of the beacon terminal 100. Accordingly, in a case where the beacon terminal 100 is not moving or the like, the electric current to be supplied to the microcomputer 11 and the wireless communication unit 13 is reduced, and thus, battery consumption can be reduced.

Meanwhile, in conventional cases, when the central unit cannot receive any detected signal from the beacon terminal, the central unit determines that the beacon terminal has moved out of the coverage area. In this embodiment, on the other hand, when the operation mode of the beacon terminal 100 switches to the low-power consumption mode, the central unit 200 is notified of the switching. Thus, the central unit 200 can determine that the beacon terminal 100 exists within the coverage area until receiving the next detected values, even though the central unit 200 does not regularly receive the detected values of the respective sensors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication terminal that communicates with an external device, the communication terminal comprising:
   a power supply;
   a sensor that detects a movement condition of the communication terminal to output a signal having a detected value corresponding to the detected movement condition;
   a wireless transceiver that transmits the detected value output from the sensor to the external device in a wireless manner;
   a controller that acquires the detected value from the sensor, and sets an operation mode of the communication terminal into one of a first mode and a second mode, the second mode being the operation mode in which a frequency of detection by the sensor and a frequency of operation of the wireless transceiver is lower than in the first mode, or in which an electric current to be supplied to part of the controller and the wireless transceiver is lower than in the first mode: and
   a storage that stores beforehand a time-series pattern of detected values corresponding to the movement condition of the communication terminal, the time-series pattern including a first time-series pattern corresponding to the first mode and a second time-series pattern corresponding to the second mode,
   wherein, the controller obtains the detected values detected by the sensor in series within a certain period of time, compares a pattern of the obtained detected values in the series with the time-series pattern stored in the storage, and sets the operation mode into one of the first mode and the second mode based on a comparison between the pattern of the obtained detected values in the series and the stored time-series pattern, and
   wherein the second time-series pattern stored in the storage corresponds to a movement pattern of the communication terminal acquired by moving the communication terminal in a predetermined direction.

2. The communication terminal according to claim 1, wherein the sensor is a motion sensor that outputs the signal corresponding to the movement condition, and each of the first and the second time-series patterns stored in the storage corresponds to a predetermined movement condition.

3. The communication terminal according to claim 1, wherein the first time-series pattern stored in the storage is the detected values obtained by operating the communication terminal in a first direction, and the second time-series pattern stored in the storage is the detected values obtained by operating the communication terminal in a second direction.

4. The communication terminal as claimed in claim 1, wherein the first time-series pattern of detected values is for setting the operation mode into the first mode, and the second time-series pattern of detected values is for setting the operation mode into the second mode, and the controller compares the pattern of the obtained detected values in the series with the first and second time-series patterns, and sets the operation mode into the first mode when the pattern of the obtained detected values in the series matches the first time-series pattern, and sets the operation mode into the second mode when the pattern of the obtained detected values in the series matches the second time-series pattern.

5. The communication terminal according to claim 1, wherein the communication terminal is a beacon terminal, and the second time-series pattern stored in the storage corresponds to the movement pattern of the beacon terminal acquired by swinging or rotating the beacon terminal in the predetermined direction.

6. A communication terminal that communicates with an external device, the communication terminal comprising:

a power supply unit;

a sensor that detects a movement condition of the communication terminal to output a signal having a value corresponding to the detected movement condition;

a wireless transceiver that transmits the detected value output from the sensor to the external device in a wireless manner;

a controller that acquires the value from the sensor, and sets an operation mode of the communication terminal into one of a first mode and a second mode as the operation mode, the second mode being the operation mode in which a frequency of detection by the sensor and a frequency of operation of the wireless transceiver is lower than in the first mode, or in which an electric current to be supplied to part of the controller and the wireless transceiver is lower than in the first mode; and a storage that stores beforehand a sequence pattern of detected values sequentially detected within a certain period of time corresponding to the movement condition of the communication terminal, the sequence pattern includes a first sequence pattern of plural detected values corresponding to a first movement of the communication terminal, and a second sequence pattern of the plural detected values corresponding to a second movement of the communication terminal that is different from the first movement;

wherein, the controller obtains the detected values detected by the sensor in series within the certain period of time, compares a pattern of the obtained detected values in the series with the sequence pattern stored in the storage, and sets the operation mode into the first mode when the obtained detected values in the series matches the first sequence pattern, and into the second mode when the obtained detected values in the series matches the second sequence pattern, wherein the second sequence pattern stored in the storage corresponds to a movement pattern of the communication terminal acquired by moving the communication terminal in a predetermined direction.

7. The communication terminal according to claim 6, wherein the sensor is a motion sensor that outputs the signal corresponding to the movement condition of the communication terminal.

* * * * *